United States Patent [19]

Westerteicher et al.

[11] Patent Number: 4,591,306
[45] Date of Patent: May 27, 1986

[54] PERIPHERAL DEVICE FOR MACHINE TOOLS

[75] Inventors: Wolfgang Westerteicher; Horst Schurfeld, both of Bielefeld, Fed. Rep. of Germany

[73] Assignee: Gildemeister-Devlieg System-Werkzeuge GmbH, Bielefeld, Fed. Rep. of Germany

[21] Appl. No.: 590,128

[22] Filed: Mar. 16, 1984

[30] Foreign Application Priority Data

Mar. 18, 1983 [DE] Fed. Rep. of Germany ....... 3309775

[51] Int. Cl.$^4$ .............................................. B23C 7/00
[52] U.S. Cl. .................................................... 409/179
[58] Field of Search ....................... 409/179, 218, 220; 408/91

[56] References Cited

U.S. PATENT DOCUMENTS 3,319,528  5/1967  Cooperman .................... 409/220 X Primary Examiner—Eugene F. Desmond
Attorney, Agent, or Firm—Sprung Horn Kramer & Woods

[57] ABSTRACT

The coordinate slides of a peripheral device for machine tools, are guided in a guide and are manually advanced for purposes of coarse adjustment. For purposes of fine adjustment, each coordinate slide can be coupled with an associated fine-adjustment pinion gear by means of non-positive clamps. The clamps, positioned on the slide, are often capable of being activated only with a lot of grouping around on the part of the operator making the adjustment. In the peripheral equipment in accordance with the invention every clamping element is electrically activated so that the activating switch can be positioned convenient to reach next to the activating member of the fine-adjustment pinion gear. Adjusting the equipment is accordingly essentially facilitated.

10 Claims, 5 Drawing Figures

PERIPHERAL DEVICE FOR MACHINE TOOLS

BACKGROUND OF THE INVENTION

The present invention relates to a peripheral device for machine tools. Peripheral devices such as measuring devices, tool-adjustment devices, and similar equipment have one or more coordinate slides, each of which is guided in a guide and can be rapidly displaced manually along the slide for purposes of coarse adjustment or displaced with a fine-adjustment pinion gear for purposes of fine adjustment, and each of which can be coupled through a fine-adjustment device with an associated fine-adjustment pinion gear.

The driven member of the fine-adjustment pinion gear in known devices of the aforesaid type is blocked by a manually activated clamping element like a bushing clamp. Embodiments in which the clamping element is a manually rotated self-locking spindle drive mechanism are also known.

One drawback of all of these embodiments is that the clamping element is mounted on the slide that is to be advanced. Access to the clamping element to fasten the slide in a particular setting is often difficult, which complicates adjustment. Another drawback is that the clamping element can be relatively far from the operating element, depending on the setting. Since adjustments can accordingly not be made from one position, the operator performing the adjustments must move around more.

SUMMARY OF THE INVENTION

The object of the present invention is to improve the devices of the aforesaid type to the extent that the clamping element can be conveniently activated no matter what position the slide is in.

This object is attained in accordance with the invention by an electrically activated clamping element that acts directly or indirectly on the driven member of the fine-adjustment device, that has an activating switch positioned next to the member that activates the fine-adjustment device and that is fastened to the slide or to the slide guide.

It is now possible to utilize an electrically activated clamping element to separate the activating element from the parts mounted on the slide that do the clamping. The activating element can also be mounted at whatever point is most convenient for fine adjustment.

In one preferred embodiment of the invention the clamping element consists of a permanent magnet and of an electromagnet that can be excited by the activating switch, the magnets being polarized so that the magnetic field of the permanent magnet is canceled when the electromagnet is excited. This design makes it possible to employ simple components that have been proven in the art. The forces of the permanent magnet are simultaneously exploited in an especially practical way to directly block the slide at the driven member of the fine-adjustment pinion gear so that no further mechanical parts are necessary and the equipment can be manufactured at minimum expense. The forces of the permanent magnet will simultaneously be fully exploited if the clamping element is attached to the slide or slide guide in such a way that the opposite side of the permanent magnet rests against the driven member of the fine-adjustment pinion gear. In this case it is especially practical for a diaphragm, preferably of a metallic material, to be positioned between the attached surface of the clamping element and the slide or slide guide to ensure that errors in alignment will be compensated and the effective surfaces of the permanent magnet will rest entirely against the the driven member of the fine-adjustment pinion gear.

In another preferred embodiment the clamping element consists of an electrically activated solenoid that acts on a clamping bolt that is positioned with its longitudinal axis at a right angle to the driven member of the fine-adjustment pinion gear and that has a transverse bore to accommodate the driven member of the fine-adjustment pinion gear. In this embodiment the forces needed to block the driven member of the fine-adjustment pinion gear are generated by mechanical frictional forces, which can be an advantage in certain applications.

Further characteristics and features of the present application will be evident from the following detailed description of preferred embodiments.

Some preferred embodiments of the invention will now be described with reference to the attached drawings, wherein:

DETAILED DESCRIPTION OF THE PREFERRED EMBODIMENTS

In the embodiments of the peripheral device in accordance with the invention illustrated in FIGS. 1 through 5 only one coordinate slide, guided in one guide and advanced by means of one fine-adjustment pinion gear, is depicted for the sake of simplicity although at least one more slide is necessary in the same sense.

Figure 1:
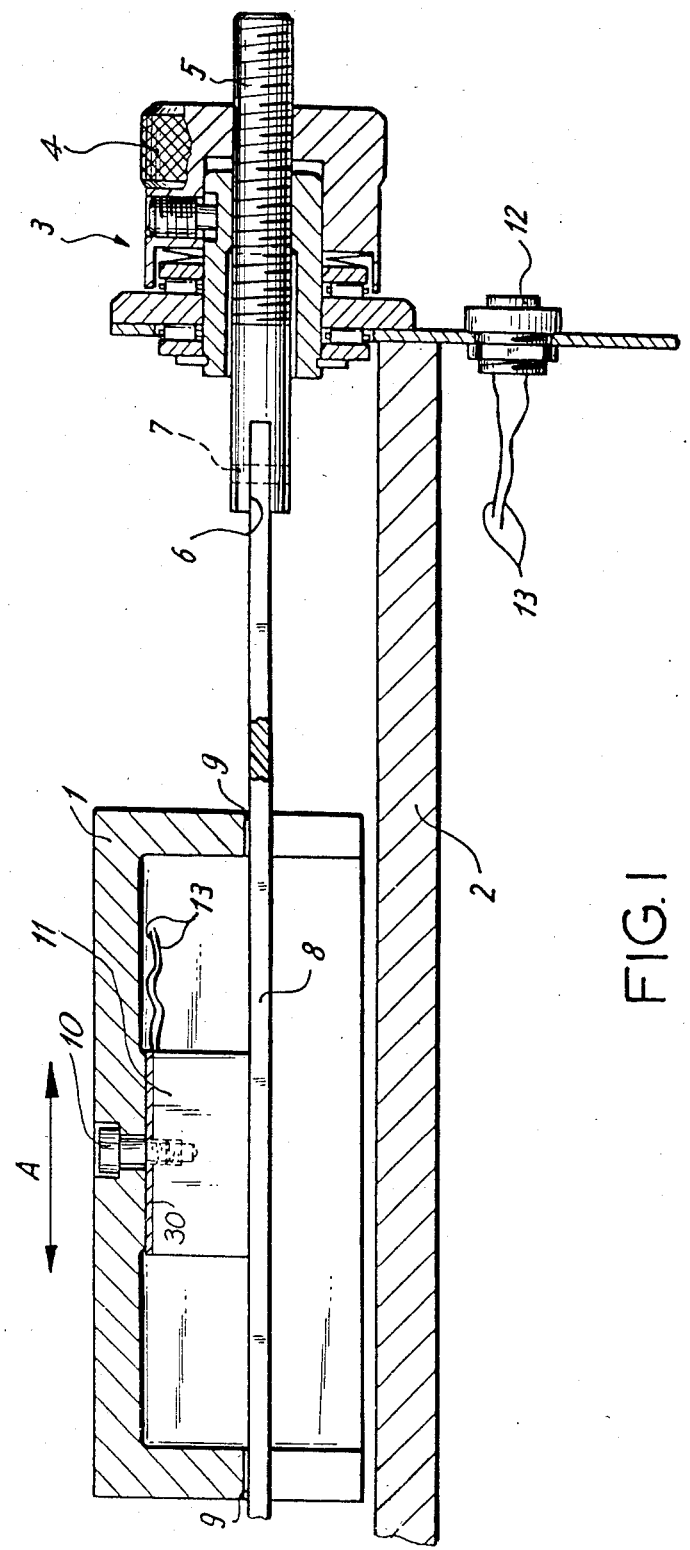
FIG. 1 is a longitudinal section through one embodiment, in which the fine-adjustment pinion gear is attached to the slide-guide component and the driven member of the fine-adjustment pinion gear is blocked by magnetic forces.

In the embodiment illustrated in FIG. 1 a coordinate slide 1, not depicted in detail, is guided in a guide 2. A known fine adjustment device 3, not described in detail, is attached to one end face of stationary guide 2. Fine adjustment device 3 has an activating member that is in the present embodiment a knurled nut 4. Fine-adjustment device 3 also has a centrally positioned threaded bolt 5 having a forked structure with a recess 6 on the end facing away from knurled nut 4. A bolt 7 secures a coupling rod 8 with a rectangular cross-section in the recess 6 in threaded bolt 5. The coordinate slide 1 in the present embodiment is U-shaped as viewed in longitudinal section. Each of its vertical walls has a perforation 9, through which coupling rod 8 passes. A clamping element 11 with a free surface that rests against coupling rod 8 is attached with screws 10 to the inner surface of the roof of coordinate slide 1 with metallic diaphragm 30 therebetween. In the embodiment illustrated in FIG. 1 the clamping element, which is not depicted in detail, consists of a permanent magnet and an electromagnet.

The electromagnet is electrically connected by means of a cable connection 13 to a button 12 mounted below fine-adjustment device 3. Activating button 12 controls the current. The circuitry is designed so that the field built up around the electromagnet by the current will cancel the field around the permanent magnet, allowing a force equilibrium to prevail.

To adjust coordinate slide 1, the electromagnet is excited by means of button 12, upon which slide 1 can be manually displaced in the direction indicated by arrow A without applying particular strength. This procedure can be considered a coarse adjustment. Once the slide has been advanced into the desired position, the current is removed from the electromagnet, upon which the permanent magnet in clamping device 11 will force coordinate slide 1 non-positively against coupling rod 8. Knurled nut 4 on fine-adjustment device 3 is then twisted to adjust coordinate slide 1 with extreme precision, also in the direction indicated by arrow A.

Figure 2:
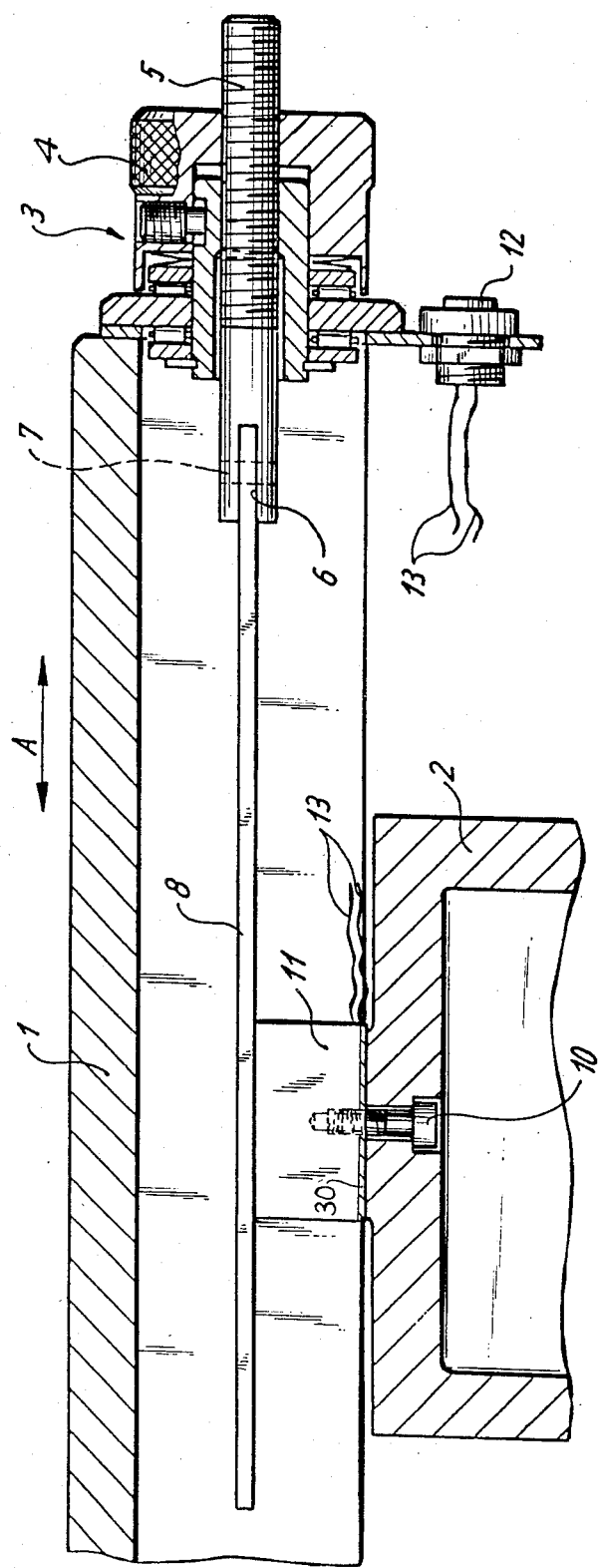
FIG. 2 is a longitudinal section through another embodiment in which the fine-adjustment pinion gear is attached to the the slide and the driven member of the fine-adjustment pinion gear is blocked by magnetic forces.

The embodiment illustrated in FIG. 2 differs from that illustrated in FIG. 1 in that fine-adjustment device 3 is attached to coordinate slide 1. Furthermore, the cross-section of guide 2 is U-shaped and the cross-section of coordinate slide 1 is rectangular. A clamping element 11 consisting of a permanent magnet and an electromagnet is fastened to the outside of the roof of guide 2 with screws 10 with metallic diaphragm 30 therebetween. In this case the free surface of the clamping element again rests against coupling rod 8. As a comparison of the two FIGS. 1 and 2 will reveal, the embodiment in FIG. 2 can be considered the reverse of that in FIG. 1. Since fine-adjustment device 3 is fastened to one end face of coordinate slide 1, the device is displaced along with the slide. In both embodiments, however, adjustment can be undertaken through fine-adjustment device 3 only when there is no current in the electromagnet in clamping element 11.

Figure 3:
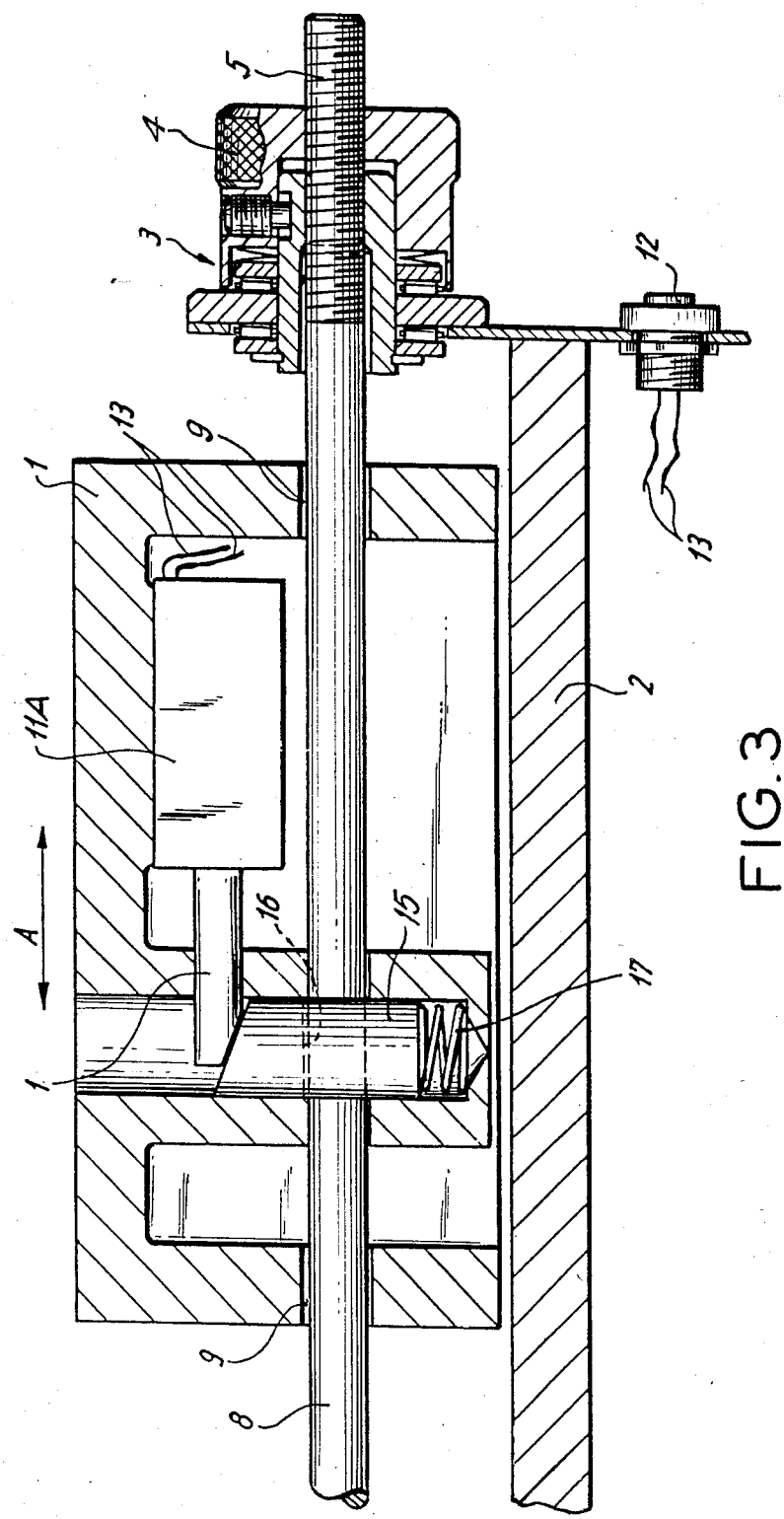
FIGS. 3 through 5 illustrate other embodiments in which the driven member of the fine-adjustment pinion gear is blocked by a clamping bolt activated by solenoids.

The embodiment illustrated in FIG. 3 is similar to that illustrated in FIG. 1. Clamping element 11A, however, is an electrically activated solenoid with a plunger 14 that acts on a clamping bolt 15 that can be displaced perpendicular to coupling rod 8. Clamping bolt 15 can be displaced within a bore that parallels the walls of U-shaped coordinate slide 1. The bore is a blind bore, closed off at the end facing guide 2. Clamping bolt 15 has an access bore 16 that extends at an angle to its length and through which a coupling rod 8 passes. There is a compression spring 17 in the blind bore that maintains the access bore 16 of clamping bolt 15 in constant contact with coupling rod 8. The end of clamping bolt 15 that faces plunger 14 slopes from the horizontal in the form of a slanting plane surface. The free end of plunger 14 also slopes from the horizontal in the form of a slanting plane surface. When the solenoid is not supplied with current, these surfaces are in contact or almost in contact.

To manually displace coordinate slide 1, button 12 is activated to excite the solenoid in clamping element 11A, advancing plunger 14. Clamping bolt 15 is then displaced against the force of compression spring 17 so that coordinate slide 1 can be coarsely adjusted by advancing it manually. For fine adjustment the solenoid is rendered currentless by means of button 12, allowing compression spring 17 to force clamping bolt 15 against coupling rod 8. The compression spring 17 in the embodiment illustrated in FIG. 3 corresponds to the permanent magnet in the clamping element 11 of the embodiments illustrated in FIGS. 1 and 2. When the solenoid in clamping element 11A is rendered currentless, the plunger is retracted by a recuperating spring, not illustrated, inside the solenoid. A double solenoid can also be employed instead of a solenoid with a recuperating spring.

Figure 4:
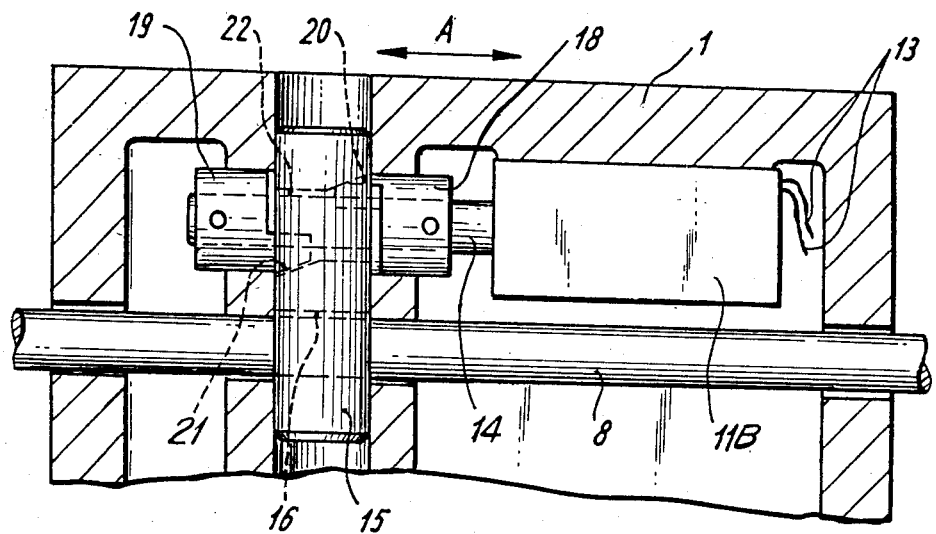

The embodiment illustrated in FIG. 4 corresponds essentially to that illustrated in FIG. 3 although clamping element 11B in this case is a double solenoid. Plunger 14 has two activating cams 18 and 19 on opposite sides and displaced at an angle of 180° to each other. Each activating cam 18, 19 has a projecting nose 20, 21 and the cams are positioned so that noses 20 and 21 face each other. The outside of each nose has a surface that slopes from the horizontal and rests against an appropriate surface on clamping bolt 15. Clamping bolt 15 is accordingly provided with a corresponding perforation 22. The double solenoid in clamping element 11B is electrically connected in a way that is not illustrated in detail by means of a cable connection 13 to a switch or button, not illustrated. When the plunger is advanced into the left-hand limiting position, access bore 16 will rest against coupling rod 8. Coordinate slide 1 can then be fine-adjusted by means of a fine-adjustment device that is not illustrated for this embodiment. When plunger 14 is advanced into the right-hand limiting position, the connection between clamping bolt 15 and coupling rod 8 will be interrupted and coordinate slide 1 can be coarse-adjusted manually.

Figure 5:
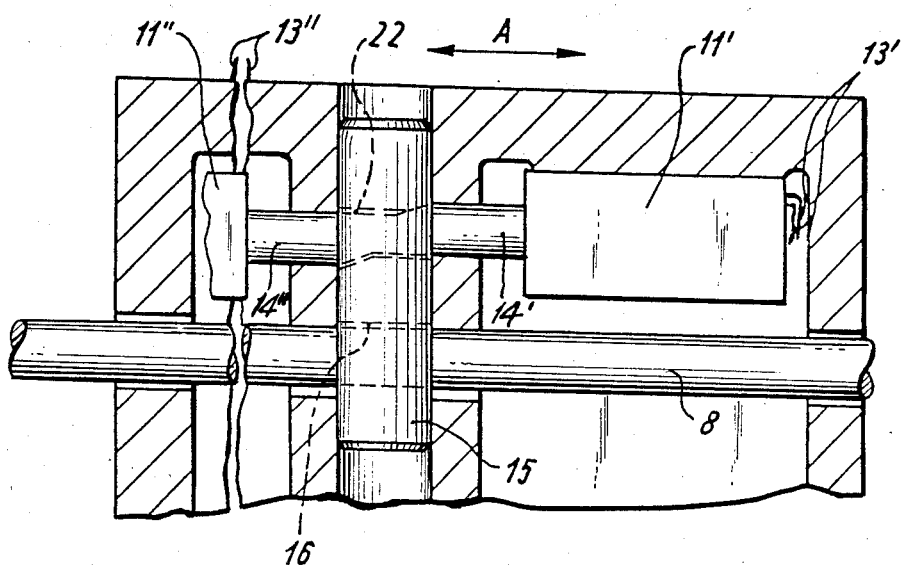

In the embodiment illustrated in FIG. 5 clamping element consists of two simple solenoid housings 11' and 11" mounted on opposite sides and with facing plungers 14', 14". The longitudinal axes of each solenoid housing of clamping elements 11', 11" lie in a common axis. Each plunger 14', 14" has a surface that slopes from the horizontal at its free end and a perforation 22 through clamping bolt 15 has matching surfaces. Each simple solenoid 11' and 11" is electrically connected by means of a cable connection 13', 13" to a corresponding switch or button. Simple solenoids 11' and 11" are poled so that one plunger advances while the other retracts. When the plunger 14 in simple solenoid 11' is in the left-hand limiting position, the clamping bolt is displaced to produce a non-positive connection between coupling rod 8 and clamping bolt 15. Coordinate slide 1 can then be finely adjusted with a fine-adjustment device that is not illustrated. When the plunger 140 in simple solenoid 11' is in the right-hand limiting position, at which time the plunger 14 in simple solenoid 11" will also be in the right-hand limiting position, the connection between clamping bolt 15 and coupling rod 8 will be interrupted and coordinate slide 1 can be coarse-adjusted manually.

The fine-adjustment device 3 and the button 12 for electrically activating clamping element 11 have been depicted in FIGS. 1 through 3. The system if similar in the embodiments illustrated in FIGS. 4 and 5. As will be evident from FIGS. 1 through 3, button 12 is positioned below fine-adjustment device 3. Another position is, however, also conceivable. It is essential for fine-adjustment device 3 to be in a position where it is convenient to reach so it and the element that activates clamping element 11 can be operated without a lot of groping around.

It will be appreciated that the instant specification and claims are set forth by way of illustration and not limitation, and that various modifications and changes may be made without departing from the spirit and scope of the present invention.

What is claimed is:

1. In a peripheral device for machine tools, the device having at least one coordinate slide means guiding the slide in a guide for effecting rapid manual displacement along the guide for coarse adjustment and means for displacing the slide relative to the guide for fine adjustment including a driven member and an activating member, the improvement wherein the coarse adjustment means comprises electrically activated clamping means acting at least indirectly on the driven member of the fine adjustment means and an activating switch positioned adjacent to the activating member of the fine adjustment means and fastened to one of the slide and the guide, wherein the clamping means comprises a permanent magnet and an electromagnet and wherein the activating switch is operable to effect excitation of the electromagnet and wherein the magnets are poled so that the magnetic field of the permanent magnet is cancelled when the electromagnet is excited to obtain an equilibrium of forces.

2. The device as in claim 1, wherein the clamping means includes means fastening same to rest against one of the slide and guide such that an opposite surface of the clamping means rests against the driven member of the fine adjustment means.

3. The device as in claim 2, further comprising a diaphragm disposed between the clamping means and the slide and guide.

4. In a peripheral device for machine tools, the device having at least one coordinate slide means guiding the slide in a guide for effecting rapid manual displacement along the guide for coarse adjustment and means for displacing the slide relative to the guide for fine adjustment including a driven member and an activating member, the improvement wherein the coarse adjustment means comprises electrically activated clamping means acting at least indirectly on the driven member of the fine adjustment means and an activating switch positioned adjacent to the activating member of the fine adjustment means and fastened to one of the slide and the guide, wherein the clamping means comprises an electrically activated solenoid, a clamping bolt on which the solenoid acts, wherein the longitudinal axis of the clamping bolt is at an angle to the driven member of the fine-adjustment means and wherein the clamping bolt has an access bore through which the driven member of the fine-adjustment means passes.

5. The device as in claim 4, further comprising a compression spring biasing the clamping bolt at the end thereof facing the guide and wherein the solenoid has a plunger articulated to the opposite, free, end of the bolt.

6. The device in claim 5, wherein the solenoid is positioned with its longitudinal axis at an angle to the longitudinal axis of the clamping bolt, wherein the end of the clamping bolt facing the plunger has a surface that rises toward the end facing away from the solenoid and slopes away from its longitudinal axis, and wherein the free end of the plunger has a surface that corresponds to the slope of the associated end of the clamping bolt.

7. The device as in claim 4, wherein the solenoid is a double solenoid, with a plunger having two opposing displacement surfaces that extend in the same direction and slope in relation to the central longitudinal axis.

8. The device as in claim 7, wherein the plunger bears two identical activating cams on opposite sides and displaced at an angle of 180° to each other, each cam having nose with a displacement surface that slopes in relation to the central longitudinal axis of the plunger.

9. The device as in claim 4, wherein the clamping means comprises one solenoid positioned on each side of the clamping bolt, with the clamping bolt having a perforation that extends parallel to the driven member of the fine adjustment means and wherein each solenoid has a plunger having and end received in the perforation.

10. The device as in claim 9, wherein each end of the plunger has a displacement surface that slopes in relation to its central longitudinal axis, with the displacement surfaces of the plunger displaced at an angle of 180° from each other and wherein the perforation has wedge surfaces that contact the displacement surfaces of the plungers.

* * * * *